United States Patent
Bernecker et al.

[19]

[11] Patent Number: 6,147,320
[45] Date of Patent: Nov. 14, 2000

[54] APPARATUS FOR PROCESSING FLAT, CARD-LIKE WORKPIECES

[75] Inventors: Otto Bernecker, Neufahrn; Joseph Lass; Friedrich Winner, both of Munich; Armin Pollak, Penzberg, all of Germany

[73] Assignee: Giesecke & Devrient GmbH, Munich, Germany

[21] Appl. No.: 08/826,751

[22] Filed: Mar. 24, 1997

[30] Foreign Application Priority Data

Mar. 25, 1996 [DE] Germany .................. 196 11 713

[51] Int. Cl.⁷ .............. B23K 26/36; B23K 26/12
[52] U.S. Cl. ................ 219/121.68; 219/121.82; 219/121.86
[58] Field of Search .......... 219/121.68, 121.82, 219/121.86, 121.67; 198/346, 346.1, 468.2; 74/608; 414/225, 737; 15/346

[56] References Cited

U.S. PATENT DOCUMENTS

| | | | |
|---|---|---|---|
| 3,592,320 | 7/1971 | Binggeli | 198/346 |
| 4,205,216 | 5/1980 | Douglas | 219/121.82 |
| 4,544,181 | 10/1985 | Maurer et al. | |
| 4,863,319 | 9/1989 | Winkler et al. | 74/608 |
| 5,122,635 | 6/1992 | Knodler et al. | 219/121.63 |
| 5,207,553 | 5/1993 | Konagai | 414/737 |
| 5,249,663 | 10/1993 | McCoy et al. | 198/468.2 |
| 5,265,497 | 11/1993 | Curless | 198/346.1 |
| 5,274,212 | 12/1993 | Campbell et al. | 219/121.86 |
| 5,531,004 | 7/1996 | Ahn | 74/608 |
| 5,658,476 | 8/1997 | Gullo et al. | 219/121.86 |
| 5,661,872 | 9/1997 | Meyer et al. | 15/346 |
| 5,871,326 | 2/1999 | Haninger et al. | 414/225 |

*Primary Examiner*—Geoffrey S. Evans
*Attorney, Agent, or Firm*—Bacon & Thomas, PLLC

[57] ABSTRACT

The apparatus has a processing chamber in which a workpiece is processed with a processing tool. Additionally an introducing device is provided as part of the processing chamber wall, being disposed such that a closed space is formed at least during processing of the workpiece in the processing chamber. Additionally one disposes on the introducing device at least one workpiece holder that is rotatable by a drive about a rotation axis in the workpiece plane and is moved in or out of the processing chamber by the introducing device.

22 Claims, 7 Drawing Sheets

APPARATUS FOR PROCESSING FLAT, CARD-LIKE WORKPIECES

BACKGROUND OF THE INVENTION

1. Field of the Invention

This invention relates to an apparatus for processing flat workpieces, for example cards or book documents, according to the preamble of the main claim.

2. Description of the Related Art

Such an apparatus is known from DE-PS 29 07 004 for example. The laminated workpieces are fed into the apparatus and personalized there with various data of the future user of the respective workpiece. In one personalization step, data are inscribed in a magnetic stripe of the workpiece for example. In another step, certain data are burned by a laser beam into specially provided data areas of the workpiece.

Further it is known that safety rules must be heeded for applying lasers in order to exclude possible injury to the operator. Furthermore, gases or dusts that can be unhealthy for the operator might arise when the data are burned into the workpiece by laser light.

In order to exclude possible danger to the operator, the workpiece is transported into a processing chamber for burning in the data. The processing chamber forms a closed space during processing of the workpiece that is intended to prevent direct or indirect emergence of laser light from the processing chamber, on the one hand, and the emergence of arising gases or dusts, on the other hand. If necessary the arising gases or dusts can additionally be sucked out of the processing chamber.

For processing, the workpieces are delivered by a delivery device directly into a workpiece holder located in the processing chamber. The delivery apparatus has frictional wheels that transport the workpieces through a gap in the processing chamber into the workpiece holder within the processing chamber. The gap corresponds essentially to the measurements of the card.

A disadvantage of the known apparatus is that there is a risk of leakage during delivery of the workpiece to the processing chamber so that laser light or gases or dusts might pass out of the processing chamber. Further there is the possibility of the workpiece delivered through the relatively narrow gap getting out of control and falling onto the bottom of the processing chamber for example.

SUMMARY OF THE INVENTION

The invention is based on the problem of providing an apparatus for processing flat workpieces, for example cards or book documents, that avoids possible danger to the operator caused by leakage of laser light or gases or dusts out of the processing chamber, guarantees reliable transport of the workpiece into the processing chamber and simultaneously permits processing of both sides of the workpiece.

This problem is solved according to the invention by the features stated in the main claim. Advantageous developments are the object of the subclaims.

The basic idea of the invention consists in providing an introducing device as part of the processing chamber wall so that a closed space is formed at least in the processing chamber during processing of the workpiece. Additionally one disposes on the introducing device at least one workpiece holder that is rotatable about a rotation axis in the workpiece plane by a drive and moved in or out of the processing chamber by the introducing device.

For feeding the workpiece to the processing chamber, the introducing device with the workpiece holder is first moved into a position in which the workpiece holder is located outside the processing chamber. The workpiece is then delivered into the workpiece holder either by hand or by a suitable delivery device. The introducing device then moves the workpiece holder with the workpiece into the processing chamber.

An advantage of the invention is that the processing chamber forms a closed space with the introducing device during processing of the workpiece so that danger to the operator from laser light or gases or dusts can be excluded. Since the workpiece is delivered into the workpiece holder outside the processing chamber and not through a relatively narrow gap, delivery is much simpler and more reliable.

In a preferred embodiment the introducing device is of rotatable design and has wall elements disposed so as to form a closed space with the processing chamber at least after a rotation. Additionally at least one further workpiece holder is provided on the introducing device. The workpiece holders are disposed on the introducing device such that at least one workpiece holder is located within the processing chamber and at least one workpiece holder outside the processing chamber.

By suitably disposing the wall elements of the preferred embodiment one can ensure that the processing chamber always forms a closed space with the introducing device even during introduction of the workpiece holder with the workpiece into the processing chamber.

One advantage of the preferred embodiment is that the delivery of a workpiece into the workpiece holder or out of the workpiece holder outside the processing chamber can already by performed while a workpiece located in the workpiece holder within the processing chamber is being processed by the processing tool.

Another advantage of the preferred embodiment is that it permits a very light and compact construction that guarantees vibrationless holding of the workpiece.

BRIEF DESCRIPTION OF THE DRAWINGS

Further embodiments and advantages of the invention will be described in the following on the basis of the figures, in which.

DETAILED DESCRIPTION OF THE PREFERRED EMBODIMENTS

Figure 1:
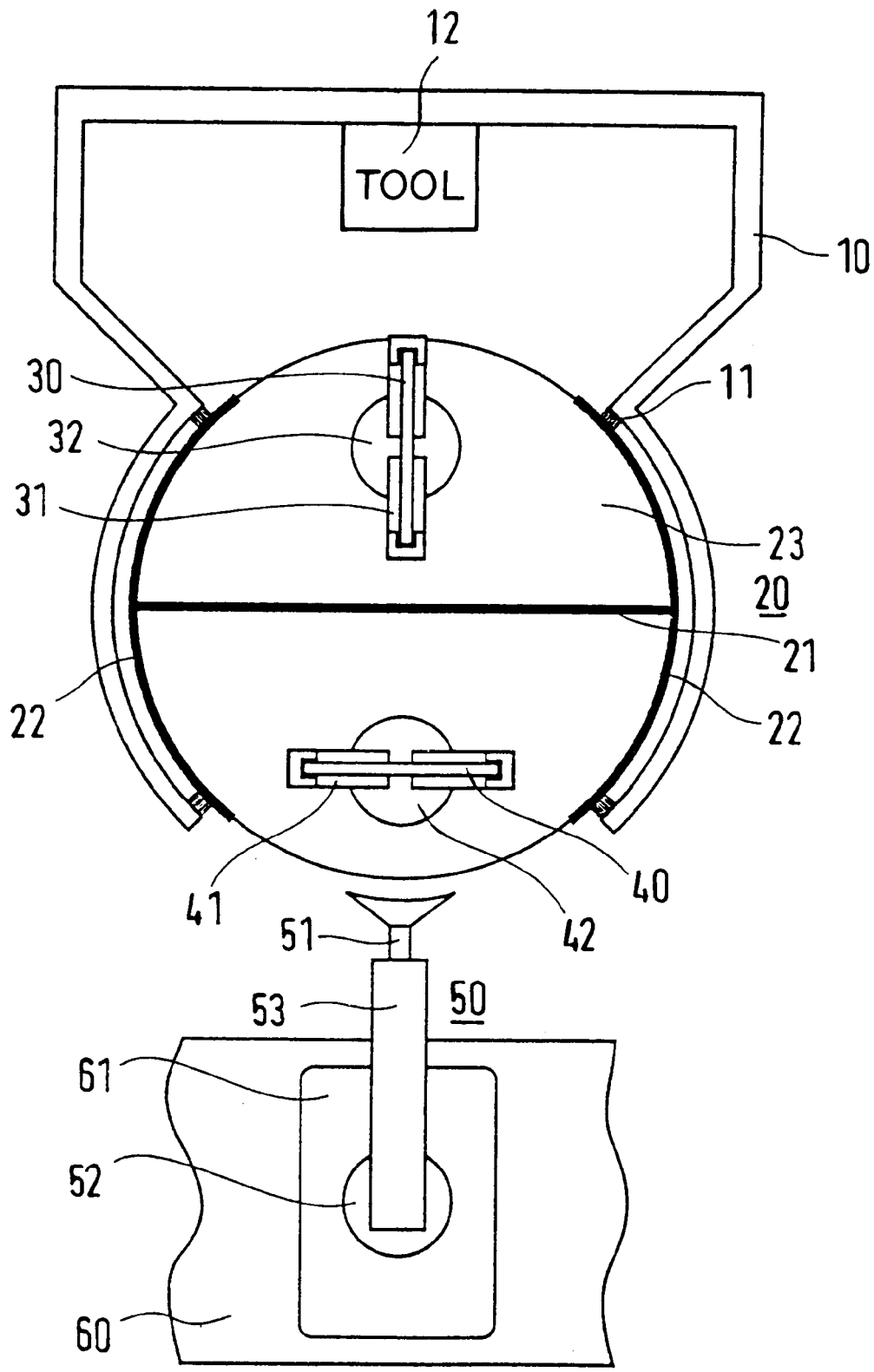
FIG. 1 shows a schematic diagram of a plan view of the preferred embodiment.

Processing chamber 10 has seals 11 for sealing processing chamber 10 from the wall elements of introducing device 20. Processing tool 12 is shown here only schematically. It is preferably a laser system with a suitable mirror assembly for deflecting the ray of light. In general neither the laser nor the mirror elements are located within processing chamber 10. It suffices for example to provide a suitable window in processing chamber 10 through which the laser beam can pass into the interior of processing chamber 10 in order to burn the particular data into the workpiece there.

Introducing device 20 is designed as part of the wall of processing chamber 10 and has, among other things, middle wall element 21, two lateral wall elements 22 and bottom element 23. The wall elements are disposed here such that introducing device 20 forms a closed space with processing chamber 10 via seals 11.

Provided on bottom element 23 of introducing device 20 in the preferred embodiment are two workpiece holders 31 and 41. Workpiece holder 31 is located inside processing chamber 10 and workpiece holder 41 outside. Workpiece holders 31, 41 contain workpieces 30, 40, respectively. Workpiece holders 31 and 41 are of rotatable design. The connection of workpiece holders 31, 41 to their drives is provided by leadthroughs 32, 42, respectively.

Delivery device 50 serves to deliver the workpieces into or out of workpiece holder 41 located outside processing chamber 10. Delivery device 50 preferably has two suction devices 51 and 52 that can be moved by drive 53.

Transport device 60 serves either for transporting workpieces 61 yet to be processed to delivery device 50 of for taking away already processed workpieces from delivery device 50. Transport device 60 is shown here by way of example as a transport band. Other transport devices can of course also be used at this place, for example rotary tables. Alternatively the workpieces can also be fed into or taken out of workpiece holder 41 by hand.

Figure 2:
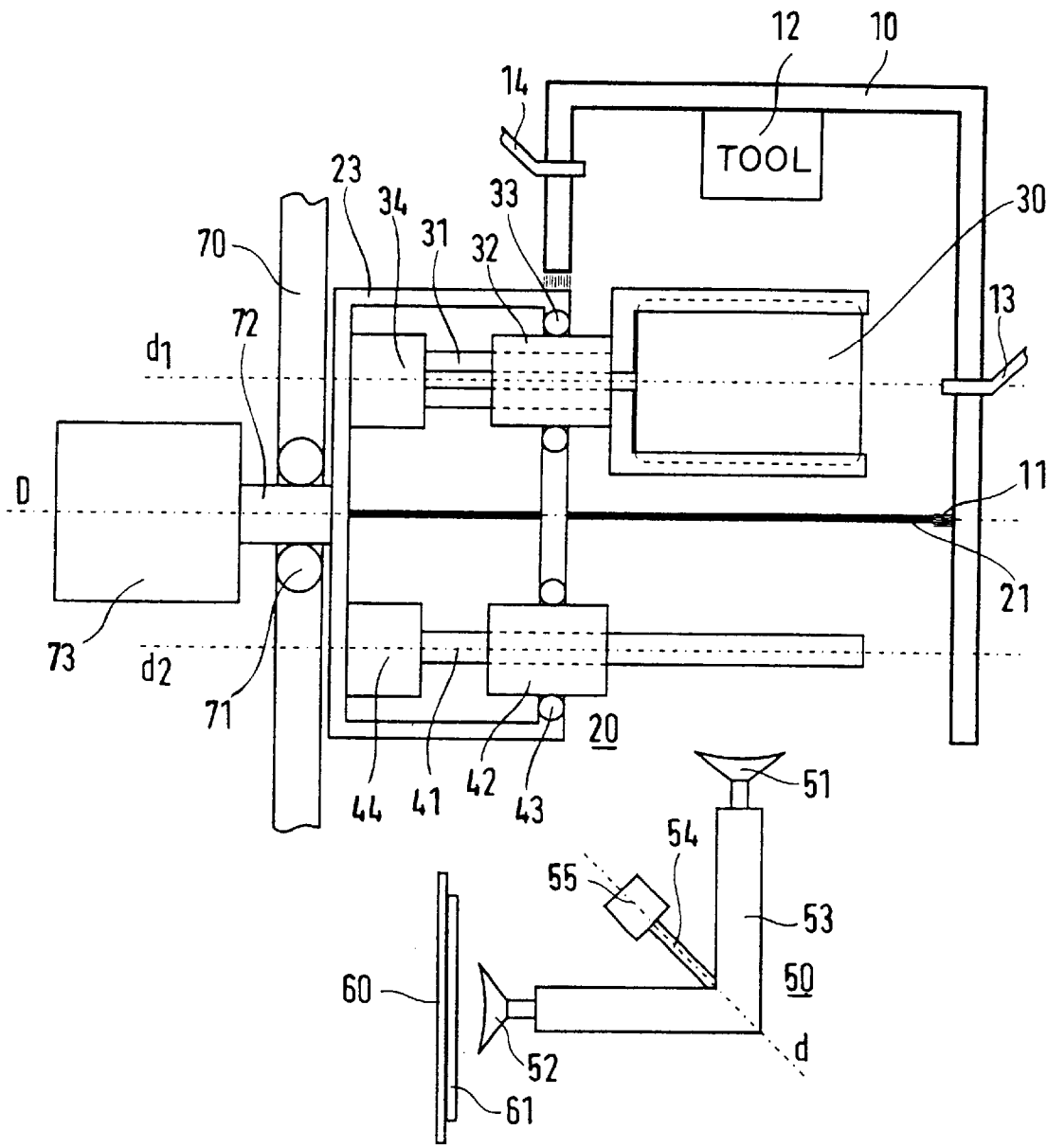
FIG. 2 shows a schematic diagram of a side view of the preferred embodiment.

FIG. 2 shows a schematic diagram of a side view of the preferred embodiment. Additionally one can see a cover element of processing chamber 10. This was omitted in FIG. 1 for clarity's sake. It can be readily recognized that processing chamber 10 forms a closed space with wall elements 21 and 23 of introducing device 20 via seals 11.

Workpiece holders 31, 41 are preferably designed as grippers. By using grippers as workpiece holders 31, 41 and suckers 51, 52 in delivery device 50 one can ensure gentle treatment and precise positioning of workpieces 30, 40. This prevents the formation of scratches as often occur when frictional wheels are used. Leadthroughs 32, 42 are mounted on bearings 33, 43 rotatably in bottom element 22 of introducing device 20. Workpiece holders 31, 41 can be rotated, opened or closed by drives 34, 44. Drives 34, 44 are preferably disposed in bottom element 22 of introducing device 20 so that they are located outside processing chamber 10.

Alternatively to the above-described grippers the workpiece holders can also be designed for example as frames with suitable spring system into which the workpieces can be snapped. Another possibility is to provide a suitably deep groove in workpiece holder 31, 41 into which workpiece 30, 40 is inserted.

Entire introducing device 20 including workpiece holders 31 and 41 is mounted rotatably on base plate 70 by bearing 71. The rotation is transmitted by drive 73 via axle 72. Drive 73 is also preferably located outside processing chamber 10. As drive 73 one preferably uses electric motors or pneumatic means.

Introducing device 20 rotates about rotation axis D. Rotation axes $d_1$, $d_2$ of workpiece holders 31, 41 are preferably disposed parallel to rotation axis D of introducing device 20. Rotation axes $d_1$, $d_2$ are in turn preferably located or a concentric circle about rotation axis D of introducing device 20. This yields a structure with a low moment of inertia and low balance error, which in turn guarantees fast rotation and thus little loss of time when changing workpieces.

If necessary one can realize a selective air supply and removal by suction in the processing chamber. Nozzle 13 integrated in a wall element supplies fresh air to workpiece 30 such that the workpiece surface is efficiently washed around. Through removing device 14 in another wall element the air is removed out of the processing chamber.

The two suckers 51 and 52 of delivery device 50 can be moved in and out by drive 53. Drive 53 is mounted rotatably about rotation axis d on axle 54 driven by drive 55. Due to the arrangement between introducing device 20 and transport device 60, suckers 51 and 52 are at right angles to each other. In case of a different arrangement between introducing device 20 and transport device 60 one can of course use any other desired angle.

In order to guarantee that the position of workpiece 30 relative to processing workpiece 12 is always the same, introducing device 20 can be connected mechanically with processing tool 12. In order to avoid disturbing influences during processing of workpiece 30, for example vibrations, one can mechanically decouple introducing device 20 and delivery device 50.

FIG. 3 shows a schematic diagram of the mode of functioning of the preferred embodiment. In FIG. 3a workpiece 30 is located in workpiece holder 31 within processing chamber 10 and being processed by processing tool 12. Workpiece holder 41 is located in the opened state outside processing chamber 10. Workpiece 40 is being delivered into workpiece holder 41 by delivery device 50 while previously processed workpiece 61 is being deposited on transport device 60.

Figure 3A:
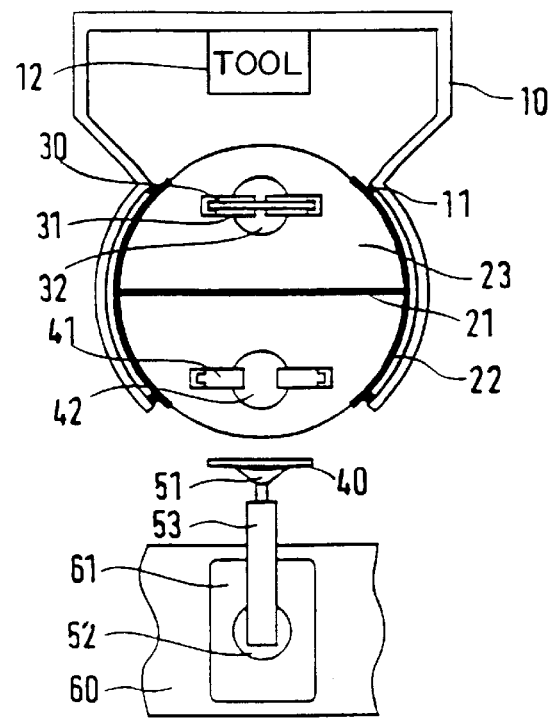
FIGS. 3*a* through 3*d* show schematic diagrams of the function course of the preferred embodiment.
Figure 3B:
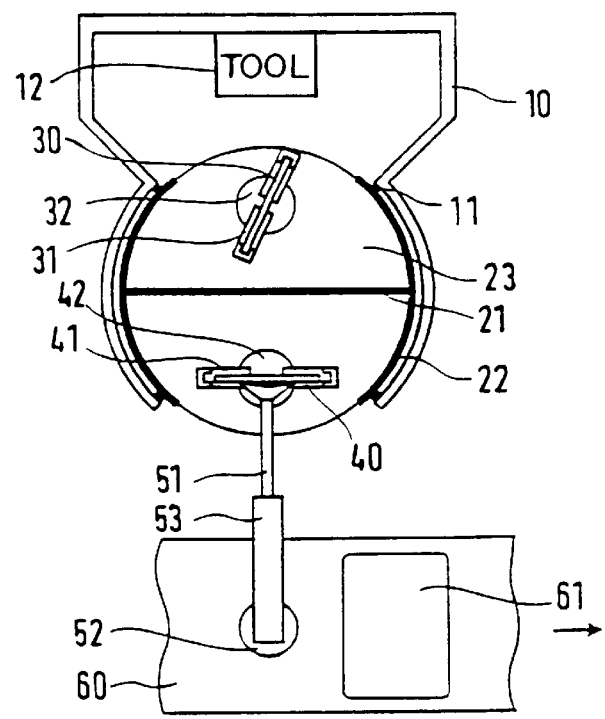

In FIG. 3b workpiece holder 31 is rotated so that the other side of workpiece 30 can be processed. While workpiece 30 is being processed sucker 51 transports workpiece 40 into a position in which workpiece 40 can be grasped by workpiece holder 41. By being closed, workpiece holder 41 holds workpiece 40 securely. Sucker 51 can be detached from the workpiece and returned to its starting position. Meanwhile transport device 60 transports previously processed workpiece 61 for example to a further-processing device not shown.

Figure 3C:
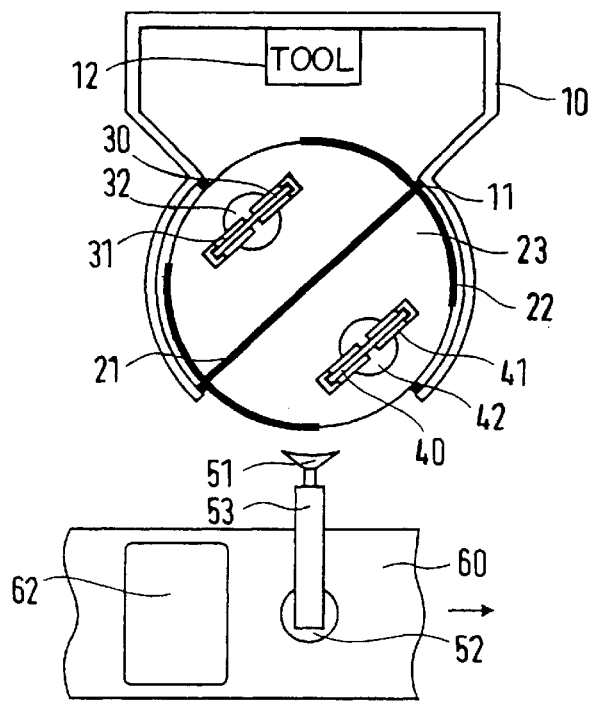
Figure 3D:
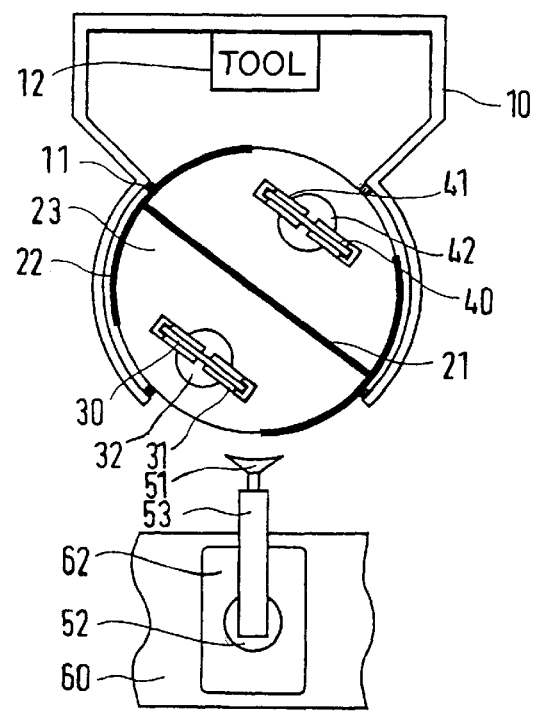

FIGS. 3c and 3d show how the position of workpieces 30 and 40 are exchanged by rotation of introducing device 20. Meanwhile transport device 60 transports next workpiece 62 to be processed into a position in which it can be grasped by sucker 52. At the end of the rotation, processed workpiece 30 is grasped by sucker 51 and next workpiece 62 to be processed grasped by sucker 52 and workpiece holder 31 opened. By a rotation of delivery device 50 about rotation axis d the positions of workpieces 30 and 62 are exchanged. Now next workpiece 62 to be processed can be delivered into workpiece holder 31 as in FIG. 3a and processed workpiece 30 deposited on transport device 60.

As FIGS. 3c and 3d show, the arrangement of wall elements 21 and 22 guarantees that the introducing device always forms a closed space with the processing chamber via seals 11 during the entire rotation. An advantage of this embodiment is that laser light can at no time emerge from processing chamber 10.

In order to reduce the moment of inertia of the introducing apparatus further one can omit the two lateral wall elements 22 of introducing device 20 for example. In this embodiment, it is guaranteed at least during processing of the workpiece that neither laser light nor gases or dusts emerge from processing chamber 10. When introducing device 20 is rotated, however, it is possible for laser light to emerge from processing chamber 10. In order to prevent such leakage one must provide suitable safety devices to guarantee that the laser is turned off during rotation of introducing device 20.

Figure 6:
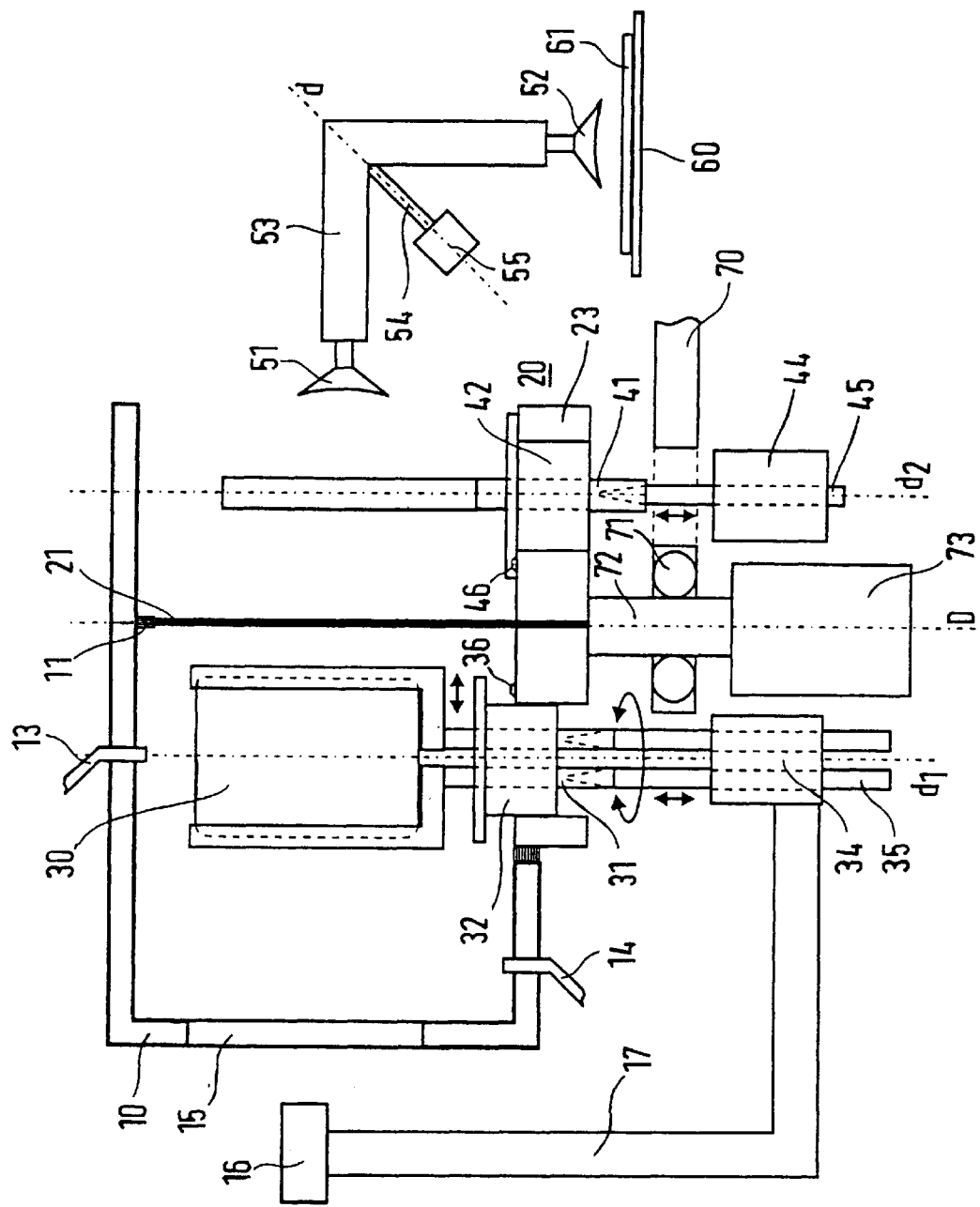
FIG. 6 shows a schematic diagram of the preferred embodiment with a mechanically decoupled workpiece holder.

FIG. 6 shows a schematic diagram of the preferred embodiment with workpiece holder 31 that is decoupled mechanically from introducing device 20 during processing of workpiece 30. For decoupling, drive 34, 44 is first connected nonpermanently with workpiece holder 31, 41. The connection between drive 34, 44 and workpiece holder 31, 41 is provided by rod assembly 35, 45 that can be moved in or out of workpiece holder 31, 41 by drive 34, 44. The contact is provided here for example by a pin on rod assembly 35, 45 that is inserted into a corresponding groove in workpiece holder 31, 41.

In the embodiment shown here, workpiece holder 41 is fixed relative to bottom element 23 by groove 46. Rod assembly 45 moved into workpiece holder 41 is in a position to open or close workpiece holder 31 for delivery of a workpiece.

Introducing device 20 is connected mechanically with delivery device 50 here so that the position between delivery device 50 and workpiece holder 41 is kept constant during delivery of a workpiece. This guarantees reliable delivery of a workpiece into the workpiece holder.

For processing workpiece 30 in workpiece holder 31 the processing tool shown here schematically is laser 16 with a suitable mirror system, the laser beam being directed onto workpiece 30 through window 15 in processing chamber 10. Laser 16 is coupled mechanically to drive 34 via connection 17. For processing workpiece 30, rod assembly 35 is moved into workpiece holder 31 and workpiece holder 31 including leadthrough 32 lifted out of bottom element 23. This mechanically decouples workpiece holder 31 from introducing device 20 so that no disturbing influences, for example vibrations, can be transferred to workpiece holder 31.

By lifting out workpiece holder 31 together with leadthrough 32 one undoes the fixation of workpiece holder 31 by groove 36 and permits workpiece holder 31 to be rotated about axis $d_1$. A spring system (not shown here) between workpiece holder 31 and leadthrough 32 permits workpiece holder 31 also to be moved within the plane of bottom element 23. By moving rod assembly 35 into workpiece holder 31 one can thus compensate an imprecision between workpiece holder 31 and laser 16 within the plane of bottom element 23.

Along with undisturbed processing through the mechanical decoupling of workpiece holder 31 from introducing device 20, it is additionally guaranteed here that workpiece 30 is always positioned exactly identically relative to laser 16 during processing, so that high processing quality can be ensured.

Figure 4:
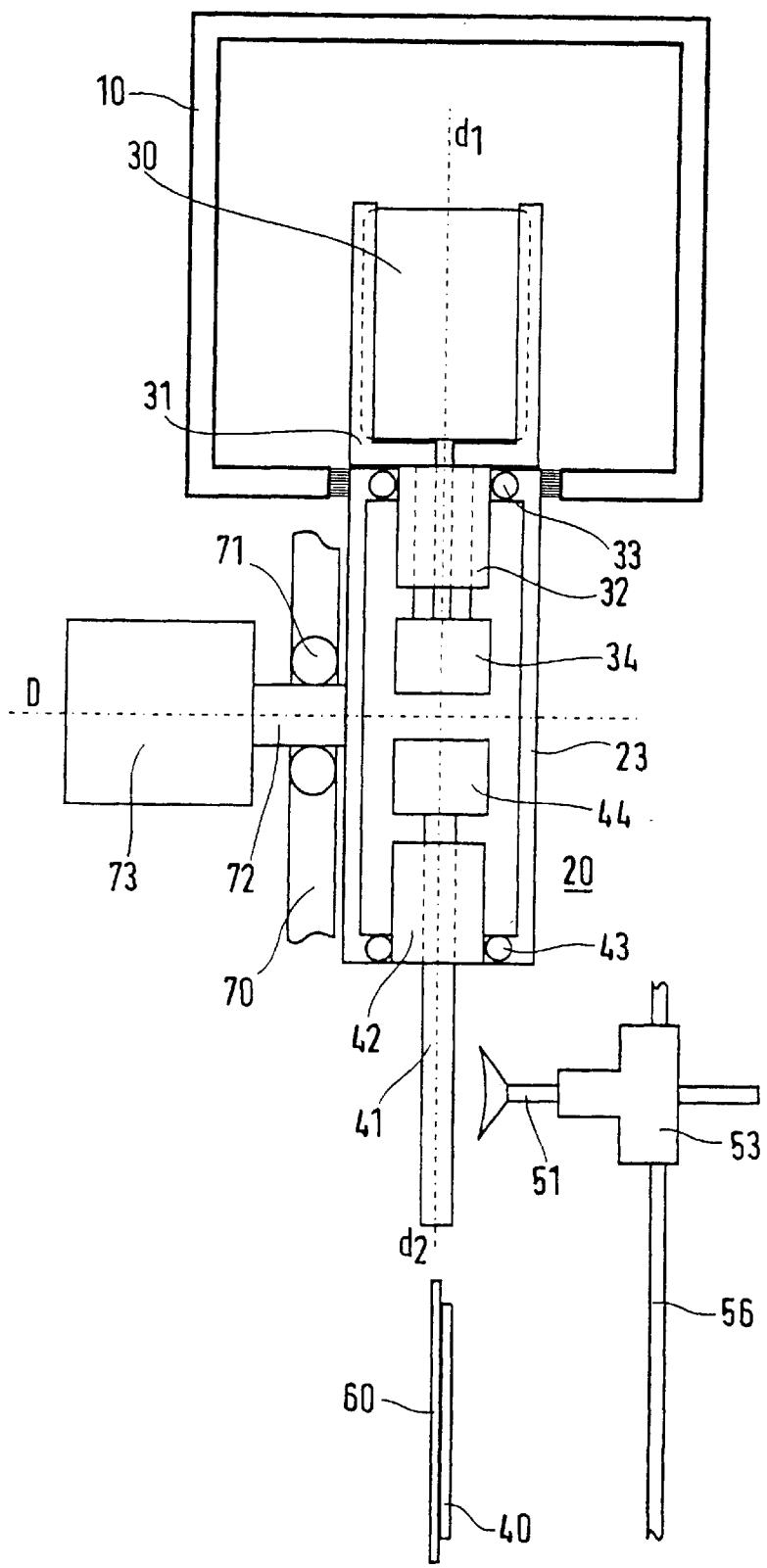
FIG. 4 shows a schematic diagram of a side view of a second embodiment.

FIG. 4 shows a side view of a second embodiment in which rotation axes $d_1$, $d_2$ of workpiece holders 31, 41 are perpendicular to rotation axis D of introducing device 20.

Delivery device 50 has, along with sucker 51 driven by drive 53, guide 56 on which drive 53 can be linearly shifted for delivery of workpiece 40.

Figure 5:
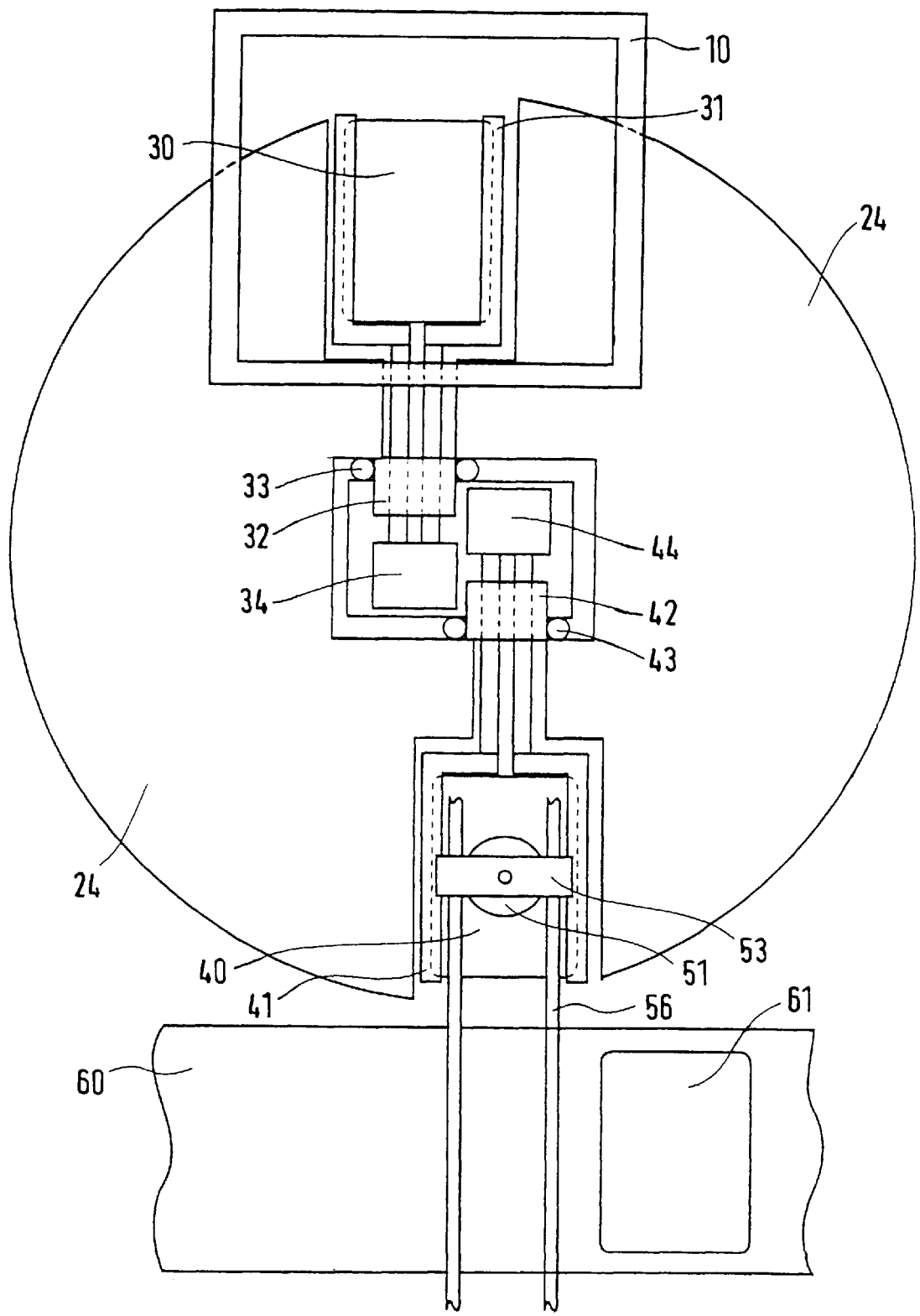
FIG. 5 shows a schematic diagram of a plan view of a third embodiment.

FIG. 5 shows a plan view of a third embodiment in which workpiece holders 31 and 41 are worked into rotary table 24. Rotation axes $d_1$ and $d_2$ of workpiece holders 31 and 41 lie in a plane perpendicular to rotation axis D of introducing device 20 here too. Since drives 34, 44 constitute the greatest proportion by weight, one can reduce the moment of inertia of rotary table 24 by placing driver 34, 44 side by side. A suitable seal between rotary table 24 and processing chamber 10 guarantees here too that no laser light or gases or dusts emerge from processing chamber 10 either during processing of a workpiece or during rotation of rotary table 24.

An advantage of the embodiments is that the delivery of workpiece 40 into workpiece holder 41 is performed outside processing chamber 10 so that delivery can be effected very reliably. Additionally another workpiece 30 is processed at the same time within processing chamber 10.

The time periods required for delivering workpiece 40 in or out of workpiece holder 41 depend on the dimensioning of the surrounding devices. The processing time of workpiece 30 results from the nature and quantity of the data to be burned into workpiece 30. This data quantity also determines the moment when workpiece 30 is rotated. The coordination of the various operations is determined by these times. The various operations can be easily coordinated by an expert with knowledge of the corresponding times.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. An apparatus configured for processing flat, card-shaped workpieces, comprising:
    a processing tool (12);
    a processing chamber (10) in which a flat, card-shaped workpiece (30, 40) is processed by the processing tool (12), the processing chamber (10) having a wall;
    an introducing device (20) configured as part of the wall of the processing chamber (10) and disposed such that the processing chamber (10) forms a closed space at least during processing of the flat, card-shaped workpiece (30) in the processing chamber (10); and
    at least one workpiece holder (31) positioned on the introducing device (2) which holds the flat, card-shaped workpiece to be processed, the at least one workpiece holder (31) rotatable by a drive (34) about a rotation axis ($d_1$) in the workpiece plane, the at least one workpiece holder (31) arranged to hold only on one side of the flat, card-shaped workpiece in the direction defined by the rotation axis ($d_1$) and to be moved in or out of the processing chamber (10) by the introducing device (20).

2. The apparatus as recited in claim 1, further comprising at least another workpiece holder (41) including a drive (44) that is additionally provided on the introducing device (20) and rotated by the drive (44) about a rotation axis ($d_2$) in a workpiece plane.

3. The apparatus as recited in claim 2, wherein the introducing device (20) has at least one wall element (21) configured such that the at least one workpiece holder (31) with the workpiece (30) to be processed is located within the processing chamber (10) and the at least another workpiece holder (41) is outside the processing chamber (10) during processing of a workpiece (30).

4. The apparatus as recited in claim 3, wherein the introducing device (20) has additional wall elements (22)

disposed such that a closed space is always formed in the processing chamber (10) even during rotation of the introducing device (20).

5. The apparatus as recited in claim 1, further comprising a drive (27) configured to rotate the introducing (20) about a rotation axis (D).

6. The apparatus as recited in claim 5, wherein the at least one workpiece holder (31) rotates about the at least one rotation axis ($d_1$) or another workpiece holder (41) rotates about another rotation axis ($d_2$), parallel to the rotation axis (D) of the introducing device (20).

7. The apparatus as recited in claim 6, wherein the rotation axes ($d_1$, $d_2$) of the workpiece holders (31, 41) are disposed on a concentric circle about the rotation axis (D) of the introducing device (20).

8. The apparatus as recited in claim 5, wherein the drive (27) of the introducing device (20) is arranged outside the processing chamber (10).

9. The apparatus as recited in claim 8, wherein the drive (27) of the introducing device (20) has an electric motor.

10. The apparatus as recited in claim 8, wherein the drive (27) of the introducing device (10) includes a pneumatic device.

11. The apparatus as recited in claim 5, wherein the at least one workpiece holder (31) rotates about the at least one rotation axis ($d_1$) and another workpiece holder (41) rotates about another rotation axis ($d_2$), parallel to the rotation axis (D) of the introducing device (20).

12. The apparatus as recited in claim 1, wherein the at least one workpiece holder (31) has a gripper for grasping the workpiece (30) or another workpiece holder (41) has another gripper for grasping another workpiece (40), and the grippers are each driven by a drive (34, 44) for opening or closing the gripper.

13. The apparatus as recited in claim 1, wherein the drives (34, 44) of the workpiece holders (31) or another workpiece holder (41) are arranged outside the processing chamber (10).

14. The apparatus as recited in claim 1, wherein the processing tool (12) has a laser.

15. The apparatus as recited in claim 1, further comprising a delivery device (50) configured for delivering the flat, card-shaped workpiece (30) to be positioned in the at least one workpiece holder (31) or removing a processed workpiece (40) from another workpiece holder (41).

16. The apparatus as recited in claim 15, wherein the delivery device (50) has at least one suction device (51).

17. The apparatus as recited in claim 16, wherein the delivery device has at least two suction devices (51, 52) mounted rotatably on an axle (54).

18. The apparatus as recited in claim 1, wherein at least one nozzle (13) is integrated in a wall element of the processing chamber (10) and configured to circulate fresh air to the workpiece (30).

19. The apparatus as recited in claim 18, wherein at least one removal device (14) is provided in a wall element of the processing chamber (10) to remove air out of the processing chamber (10).

20. The apparatus as recited in claim 1, wherein the at least one workpiece holder (31) holding the workpiece to be processed is decoupled mechanically from the introducing device (20) during processing.

21. The apparatus as recited in claim 1, wherein the at least one workpiece holder (31) has a gripper for grasping the workpiece (30) and another workpiece holder (41) has another gripper for grasping another workpiece (40), and the grippers are each driven by a drive (34, 44) for opening or closing the gripper.

22. The apparatus as recited in claim 1, wherein the drives (34, 44) of the workpiece holders (31) and another workpiece holder (41) are arranged outside the processing chamber (10).

* * * * *